UNITED STATES PATENT OFFICE.

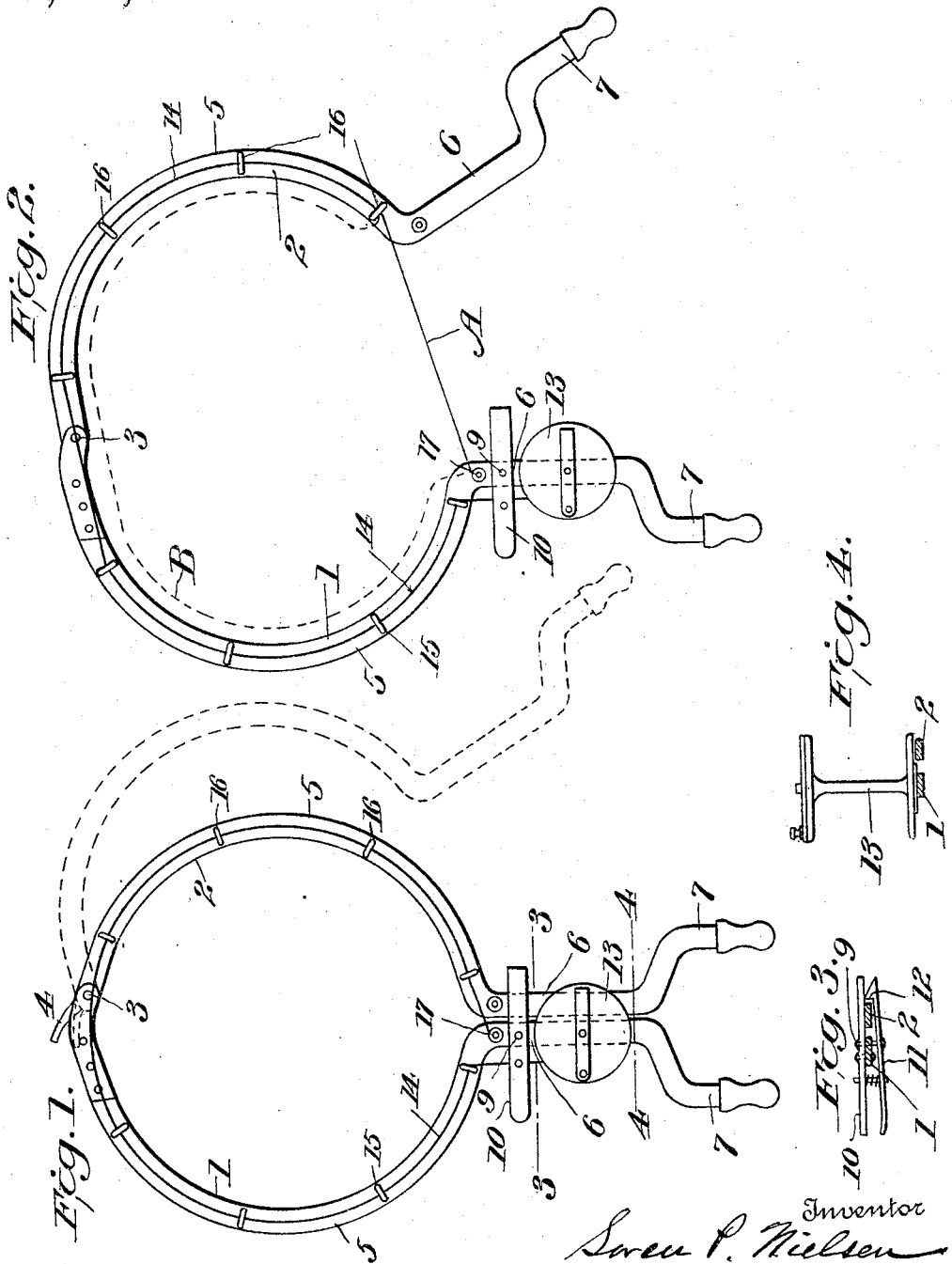

SOREN P. NIELSEN, OF NEW ULM, MINNESOTA.

CORN-SHOCK TYER.

1,211,745.      Specification of Letters Patent.      Patented Jan. 9, 1917.

Application filed April 8, 1915. Serial No. 19,867.

*To all whom it may concern:*

Be it known that I, SOREN P. NIELSEN, a subject of the King of Denmark, residing at New Ulm, in the county of Brown and State of Minnesota, have invented certain new and useful Improvements in Corn-Shock Tyers, of which the following is a specification.

This invention relates to corn shockers, and has for its object means for shocking corn by hand.

The central features of the invention consist of a pair of curved arms pivoted together, said arms supporting means for tying the shock after the same has been formed.

Another object of the invention is a device so constructed that a single person may gather corn-stalks, shock it with my invention, and tie up the shock without the aid of other parties.

In the drawings forming part of this specification,—Figure 1 is a plan view of my invention, showing the arms closed together and latched, one arm being shown open in dotted lines. Fig. 2 is a plan view of my invention open, showing particularly the position of the tying element. Fig. 3 is a detail cross section on line 3—3 of Fig. 1, and Fig. 4 is a section on the line 4—4 of Fig. 1, showing the spool in elevation.

Like characters of reference designate corresponding parts in the several figures of the drawings.

In constructing my invention, I provide a pair of curved arms 1 and 2, pivoted together at 3, a stop 4, being provided to limit the pivotal movement of the arms. Each arm is provided with a semicircular portion 5, straight portion 6, and an outwardly curved handle portion 7. Secured to the upper face of the arm 1, by a fastening device 9, is a short bar 10, beneath which is mounted a spring latch 11. The latch 11 is provided with a shoulder 12 for engaging and holding the bar 2 when the arms are brought together.

Mounted upon the arm 1, adjacent the latch, is a spool 13, upon which is wound a wire 14, the wire passing from the spool and through eyes 15 on the arm 1 and eyes 16 on arm 2, then back and fastened at its end to a fastening device 17 upon the arm 1. By reference to Fig. 2 of the drawings, it will be seen that the wire is stretched across the opening between the arms as shown at A, when the arms are open, and as cornstalks are forced into the shocker the wire assumes the position shown by the dotted line B in said figure.

The operation of my invention is as follows: The arms 1 and 2 are swung open upon their pivot and cornstalks or other material to be shocked is placed within the curvature of the arms until all the space embraced by the curved arms is occupied, the binding wire assuming the position shown in dotted line in Fig. 2 during this operation. The arms are then closed compressing the stalks into a smaller space, and latched together. It is then an easy matter to fasten the ends of the wire and the shock is complete. The arms are then unlatched, the device removed from the shock and the above described operation may be repeated.

Having thus described my invention, what I claim is:—

A corn shocking device comprising a pair of arms pivoted together, a stop secured to one of the arms for limiting the movement with relation to the other of said arms, a spring actuated latch secured to one of the arms for engaging the other arm when said arms are brought together, eyes upon each of the arms to receive binding material, means for holding the free end of the binding material secured to one arm, thereby enabling said binding material to encircle the shock when the arms are fastened around said shock and handles secured to each arm for operating said arms.

In testimony whereof I affix my signature in presence of two witnesses.

SOREN P. NIELSEN.

Witnesses:
     GEORGE HOGEN,
     R. M. PFAENDER.